Figure 1:
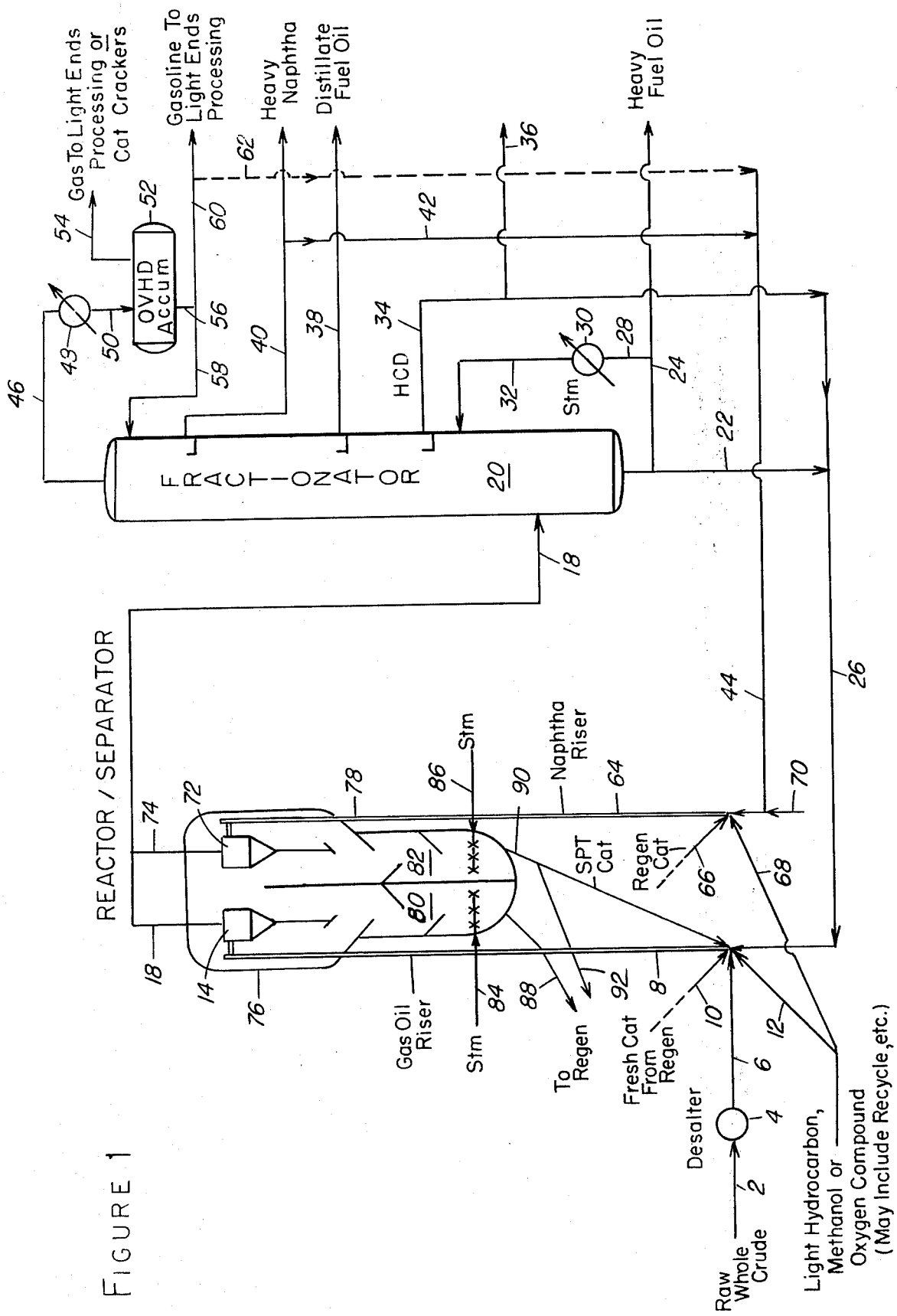

United States Patent [19]

Owen et al.

[11] 3,974,062

[45] Aug. 10, 1976

[54] CONVERSION OF FULL RANGE CRUDE OILS WITH LOW MOLECULAR WEIGHT CARBON-HYDROGEN FRAGMENT CONTRIBUTORS OVER ZEOLITE CATALYSTS

[75] Inventors: Hartley Owen, Belle Mead; Edward J. Rosinski, Deptford; Paul B. Venuto, Cherry Hill, all of N.J.

[73] Assignee: Mobil Oil Corporation, New York, N.Y.

[22] Filed: Oct. 17, 1974

[21] Appl. No.: 515,757

[52] U.S. Cl. ............................ 208/74; 208/120; 208/164; 208/251 R; 208/254 R; 260/668 R; 260/673
[51] Int. Cl.² ................. B01J 8/24; C01B 29/28; C10G 11/02
[58] Field of Search ............... 208/120, 74, 254 R, 208/254 H

[56] References Cited
UNITED STATES PATENTS

| | | | |
|---|---|---|---|
| 2,211,944 | 8/1940 | Andrews et al. | 208/121 |
| 2,456,584 | 12/1948 | Gorin et al. | 260/668 |
| 3,506,731 | 4/1970 | Frilette et al. | 260/672 |
| 3,533,936 | 10/1970 | Weisz | 208/56 |
| 3,617,496 | 11/1971 | Bryson et al. | 208/80 |
| 3,728,408 | 4/1973 | Tobias | 260/668 C |
| 3,743,593 | 7/1973 | Saxton | 208/55 |
| 3,748,251 | 7/1973 | Demmel et al. | 208/74 |
| 3,756,942 | 9/1973 | Cattanach | 208/137 |
| 3,758,403 | 9/1973 | Rosinski et al. | 208/120 |
| 3,760,024 | 9/1973 | Cattanach | 260/673 |
| 3,830,724 | 11/1974 | Schutt | 208/111 |
| 3,849,291 | 11/1974 | Owen | 208/78 |
| 3,856,659 | 12/1974 | Owen | 208/80 |
| 3,894,106 | 7/1975 | Chang et al. | 260/668 R |
| 3,894,107 | 7/1975 | Butter et al. | 260/668 R |
| 3,894,932 | 7/1975 | Owen | 208/74 |

Primary Examiner—Delbert E. Gantz
Assistant Examiner—G. E. Schmitkons
Attorney, Agent, or Firm—Charles A. Huggett; Carl D. Farnsworth

[57] ABSTRACT

A refinery process is described for converting desalted full range crude oils and syncrudes derived from coal, shale and tar sands. The process involves mixing and reacting the full range heavy oil feed with a low molecular weight carbon-hydrogen fragment contributor such as methanol or $C_2$-$C_5$ olefins in the presence of a fluid zeolite cracking catalyst comprising mordenite.

14 Claims, 1 Drawing Figure ent process conditions. Further, the catalyst functions referred to herein may be on the same catalyst particle, or on different catalyst particles such as a mixture of crystalline zeolite catalytic materials.

CONVERSION OF FULL RANGE CRUDE OILS WITH LOW MOLECULAR WEIGHT CARBON-HYDROGEN FRAGMENT CONTRIBUTORS OVER ZEOLITE CATALYSTS

RELATED APPLICATION

This application is related to application Ser. No. 473,608 filed May 28, 1974.

BACKGROUND OF THE INVENTION

There is a continuing demand for refinery products, including gasoline, distillates and gaseous fuels. Because of the energy crisis, petroleum refiners are often forced to work with heavier, often hydrogen deficient and high impurity feeds. Also, there is a growing pressure to utilize every fraction of the so-called barrel, including light refinery gases in the effort to optimize liquid fuel production.

In the present concept, a refinery scheme for processing whole crude is proposed, in which a carbon-hydrogen fragment contributing material and desalted crude are mixed with one another and reacted by contact with a cracking or acid function catalyst under conditions to produce products of quality and yield superior to that obtainable heretofore. The cracking operation may occur in the presence of a hydrogen activating function.

SUMMARY OF THE INVENTION

The present invention is concerned with providing mobile hydrogen alone or combined with carbon in molecular fragments in a crystalline zeolite hydrocarbon conversion operation in such amounts that the yield of desired hydrocarbon product will be simultaneously increased. In a more particular aspect the present invention is concerned with providing hydrogen contributing materials and/or carbon-hydrogen molecular fragments to a catalytic cracking operation which are lower boiling than a high molecular weight hydrocarbon charged to the cracking operation. In yet another aspect the present invention is concerned with providing the hydrocarbon conversion operation with one or more crystalline zeolite catalytic materials which will promote chemical reactions with mobile hydrogen and/or carbon-hydrogen molecular fragments in addition to promoting catalytic cracking reaction to provide useful products contributing to gasoline boiling range material.

In the present invention a "low molecular weight carbon-hydrogen contributing material" and a "high molecular weight feedstock" are intimately mixed with one another and reacted with a crystalline zeolite catalyst comprising an acid function, wherein cracking and additive carbon-hydrogen reactions occur to produce products of improved quality and superior to those formed in the absence of the "low molecular weight carbon-hydrogen contributing material." The cracking and additive reactions occur in the presence of a crystalline zeolite catalyst with hydrogen-transfer activity during exposure at an elevated temperature to a mixture of the "low molecular weight carbon-hydrogen material" and the "high molecular weight feedstock."

A particular advantage of the reaction concepts of this invention is that they occur at low pressures (i.e. at pressures commonly employed in current catalytic cracking operations or slightly higher). It is most preferred that the reactions be performed in fluidized catalyst systems (risers, dense beds, etc.), but they can also be practiced in some fixed catalyst bed arrangements or moving bed catalytic systems. The reactions described herein may occur in one stage of operation all at the same process conditions, or in a sequence of two or more stages of operation, at the same or different process conditions. Further, the catalyst functions referred to herein may be on the same catalyst particle, or on different catalyst particles such as a mixture of crystalline zeolite catalytic materials.

Some specific advantages derivable from the improved process concept of this invention include improved crackability of heavy feedstocks, increased gasoline yield and/or gasoline quality (including octane and volatility), and fuel oil fractions of improved yield and/or burning quality and lower levels of potentially polluting impurities such as sulfur and nitrogen. The need for costly high pressure hydrotreaters and hydrocrackers using expensive molecular hydrogen rich gas can thus be eliminated, or the severity requirements of the operation greatly decreased, thus saving considerable capital investment and operating costs.

By "low molecular weight carbon-hydrogen contributing material" is meant materials comprising a lesser number of carbon atoms than found in materials within the gasoline boiling range and preferably those materials containing 5 or less carbon atoms that fit into any of the categories of:

a. Hydrogen-rich molecules, i.e. molecules with wt.% H ranging from about 13.0–25.0 wt.%. This may include light paraffins, i.e. $CH_4$, $C_2H_6$, $C_3H_8$ and other materials.

b. A hydrogen donor molecule, i.e. a molecule whose chemical structure permits or favors intermolecular hydrogen transfer. This includes $CH_3OH$, other low boiling alcohols such as ethanol, n-propanol, isopropanol, n-butanol, isobutanol, etc., aliphatic ethers, other oxygen compounds (acetals, aldehydes, ketones) certain sulfur, nitrogen and halogenated compounds. These would include $C_2$–$C_5$ aliphatic mercaptans, disulfides, thioethers, primary, secondary, tertiary amines and alkylammonium compounds, and haloalkanes such as methyl chloride etc.

c. Reactants that chemically combine to generate hydrogen donors or "active" or "nascent" hydrogen, i.e. carbon monoxide, CO, especially $CO + H_2O$, $CO + H_2$, CO + alcohol, CO + olefin, etc. A catalyst with a "hydrogen-activating function" is preferred when carbon monoxide is a reactant and required when a light paraffin is a reactant.

d. Secondary Reaction Products from materials in categories (a), (b), or (c) above that are hydrogen donors themselves, or transfer hydrogen, or become involved in intermolecular hydrogen transfer in which hydrogen redistribution occurs. This includes olefins, naphthenes, or paraffins.

e. Classes of materials which are structurally or chemically equivalent to those of category (d), notably olefins, etc.

f. A combination of any or all of the materials in categories (a) through (e).

g. A preferred low molecular weight carbon-hydrogen contributor is methanol and $C_2$–$C_5$ olefins.

By "full boiling range" or "whole crude" is meant any full range crude from primary, secondary or tertiary recovery from conventional or offshore oil fields. "Whole crude" may include any full range "syncrude" such as those that can be derived from coal, shale oil, tar sands and bitumens. The "whole crude" may be virgin (straight run) or generated synthetically by blending. It is important, however, to first desalt the crude since sodium chloride is known to be a poison for the cracking operation.

By "high molecular weight feedstock" is meant any material that boils higher than a conventional gasoline end boiling point, i.e. about 11–12 C-number or higher. It is especially preferred that "high molecular weight feedstocks" include catalytic cracking feeds or potential feeds therefor such as distillate gas oils, heavy vacuum gas oils, atmospheric resids, syncrudes (from shale oil, tar sands, coal), pulverized coal and combinations thereof.

By catalyst with a "cracking or acid function" is meant an acidic composition, most preferably a solid, such as a crystalline zeolite cracking catalyst. A preferred composition includes a crystalline zeolite component (or components) intimately dispersed in a matrix.

By catalyst with a "hydrogen-activating function" is meant one of several classes of catalyst which aid in the redistribution of transfer of hydrogen, or which are classified as hydrogen dissociation, hydrogen activation, or hydrogenation catalysts. The catalyst with a "hydrogen-activating function" may or may not contain a metal function. Some of the preferred metal functions are Pt, Ni, Fe, Co, Cr, Th, (or other metal function capable of catalyzing the Fischer-Tropsch or water-gas shift reaction), or Re, W, Mo or other metal function capable of catalyzing olefin disproportionation.

The term "hydrogen transfer" is known in the art of catalytic conversion to characterize the ability to transfer hydrogen other than molecular hydrogen from one type of hydrocarbon to another with a catalyst particularly promoting the transfer. This type of chemical reaction is to be contrasted with hydrogenation catalysts or catalyst components capable of attaching hydrogen to an olefin from gaseous molecular hydrogen.

A group of highly active catalysts particularly suitable for use in the practice of the present invention are zeolitic crystalline aluminosilicates of either natural or synthetic origin having an ordered crystal structure. These crystalline zeolite materials are possessed with a high surface area per gram and are microporous. The ordered structure gives rise to a definite pore size of several different forms. For example, the crystalline zeolite may comprise one having an average pore size of about 5A such as Linde 5A or chabasite or it may be an erionite or an offretite type of crystalline zeolite. A crystalline zeolite with a pore size in the range of 8–15–A pore size such as a crystalline zeolite of the X or Y faujasite type of crystalline material may be used. Mordenite and ZSM–5 type of crystalline aluminosilicates may also be employed. In the process of the present invention it is preferred to use crystalline zeolites having a pore size sufficiently large to afford entry and egress of desired reactant molecules. Thus, the catalyst may be a large pore crystalline zeolite such as an X or Y faujasite variety or it may be a mixture of large and smaller pore crystalline zeolites. In this regard the mixed crystalline aluminosilicates used in the method of this invention will provide a pore size spread greater than 4 and less than 15 Angstrom units. The small pore zeolite portion of the catalyst may be provided by erionite, offretite, mordenite and ZSM–5 type of crystalline zeolite. Methods of preparing these various crystalline zeolites are the subject of numerous patents now available.

The aluminosilicate active components of the catalyst composite may be varied within relatively wide limits as to the crystalline aluminosilicate employed, cation character, concentration as well as in any added component by precipitation, adsorption and the like. Particularly, important variables of the zeolites employed include the silica-alumina ratio, pore diameter and spatial arrangement of cations.

The crystalline aluminosilicate or crystalline zeolites suitable for use in the present invention may be modified in activity by mixing with a matrix material of significant or little catalytic activity. It may be one providing a synergistic effect as by large molecule cracking, large pore material and act as a coke sink. Catalytically active inorganic oxide matrix material is particularly desired because of its porosity, attrition resistance and stability under the cracking reaction conditions encountered particularly in a fluid catalyst cracking operation. Inorganic oxide gels suitable for this purpose are fully disclosed in U.S. Pat. No. 3,140,253 issued July 7, 1964 and such disclosure is incorporated herein by reference.

The catalytically active inorganic oxide may be combined with a raw or natural clay, a calcined clay, or a clay which has been chemically treated with an acid or an alkali medium or both. The catalyst may also be provided with an amount of iron and/or nickel which materials are known to promote the Fischer-Tropsch reaction. The matrix material is combined with the crystalline aluminosilicate in such proportions that the resulting product contains a minor proportion of up to about 40% by weight of the aluminosilicate material and preferably from about 1% up to about 35 weight percent thereof may be employed in the final composite.

The mobile hydrogen component of the reaction mixture of the present invention may be provided from several different sources, such as the high molecular weight feed and the low molecular weight material, it being preferred to obtain hydrogen moieties from gasiform and vaporous component materials occurring in the operation lower boiling than the hydrocarbon material charged to the cracking operation. Thus, it is proposed to obtain the hydrogen moieties suitable for hydrogen distribution reactions from component and component mixtures selected from the group comprising methanol, dimethylether, CO and water, carbon monoxide and hydrogen, $CH_3SH$, $CH_3NH_2$, $(CH_3)_2NH$, $(CH_3)_3N$, $(CH_3)_4N$ and $CH_3X$, where X is a halide such as fluorine, bromine, chlorine and iodine. Of these hydrogen contributing materials it is preferred to use methanol alone or in combination with either CO alone, or CO and water together. On the other hand, it is contemplated combining light olefinic gaseous products found in pyrolysis gas and the products of catalytic cracking such as ethylene, propylene and butylene with the hydrogen and/or carbon hydrogen contributing material. In any of these combinations, it is preferred that the mobile hydrogen or the carbon-hydrogen fraction be the product of one or more chemical reactions particularly promoted by a relatively small pore crystalline zeolite such as a ZSM–5 type of crystalline zeolite or an intermediate pore size mordenite type zeolite. Methanol is a readily available commodity obtained from CO and $H_2$ synthesis, coal gasification, natural gas conversion, and other known sources.

The hydrocarbon feeds which may be processed in the cracking operation of this invention may be any heavy petroleum fraction such as atmospheric gas oil, vacuum gas oil, atmospheric and vacuum resids, synthetic crudes derived from oil shale, tar sands, coal and solvent refined coal. In short, any hydrogen deficient feedstock and preferably one that would require a more conventional high pressure hydrocracking and hydrotreating operation to render the feed suitable for use in a fluid catalytic cracking operation can be used in the method of this invention.

Current practice for upgrading high molecular weight, hydrogen-deficient, high-impurity refinery stocks generally involves either hydrotreating followed by catalytic cracking, or hydrocracking, both of which involve the use of costly gaseous hydrogen at high pressures (i.e. 500–3000 psig), in expensive, high-pressure process units. Alternately some poor quality stocks are catalytically cracked alone with low quality product being produced which requires extensive upgrading or dilution before becoming saleable. Some of these processes often require expensive gas compressors and complex heat transfer or hydrogen-quenching systems. In addition, although these processes improve conversion and product yields, significant losses in gasoline octane are often incurred, requiring a subsequent reforming step to upgrade gasoline quality.

The current concept employs a fluidized catalyst system at low pressures without the need for high pressure hydrogen gas. Such a system promotes the highly efficient contact of relatively inexpensive hydrogen contributing low molecular weight materials with heavy, refractory molecules in the presence of high-surface area cracking catalyst with or without "hydrogen-activating catalyst functions." Intermolecular hydrogen-transfer interactions and catalytic cracking reactions effected in the presence of fluidized catalyst particles minimize problems due to diffusion/mass transport limitations and/or heat transfer.

The concepts of the present invention make use of relatively cheap, low molecular weight hydrogen contributors readily available in petroleum refineries, such as light gas fractions, light olefins, low boiling liquid streams, etc. It also makes particular use of methanol, a product which is readily available in quantity, either as a transportable product from overseas natural gas conversion processes, or as a product from large scale coal, shale, or tar sand gasification. It also can utilize carbon monoxide (in combination with hydrogen contributors such as water or methanol), which gas is readily available from refinery regeneration flue gas (or other incomplete combustion processes), or from coal, shale, or tar sand gasification. Highly efficient recycle of unused hydrogen contributors can also be effected.

A particularly attractive feature of this invention is concerned with converting whole crude hydrocarbon materials. That is, a whole crude may be utilized as the charge with the light end portion thereof constituting a part of the "low molecular weight hydrogen contributor" alone or in combination with added methanol or other hydrogen contributing light materials and the heavier end portion of the whole crude constituting the "high molecular weight feedstock."

It is anticipated that as a result of the processing concepts herein defined, requirements for reforming and alkylation can be greatly reduced, thus saving the petroleum refiner investment and operating cost.

The combination reactions comprising this invention are effective in removing sulfur, oxygen, nitrogen and metal contaminants found in a whole crude or a heavy hydrocarbon portion thereof.

The chemical-conversion operation of this invention is accomplished at temperatures within the range of 400°F. up to about 1400°F. and more usually within the range of 700°F. to about 1200°F. at pressures selected from within the range of below atmospheric up to several hundred pounds but normally less than 100 psig. Preferred conditions include a temperature within the range of about 800°F. to about 1150°F. and pressures within the range of atmospheric to about 100 psig.

In an operation embodying the concepts of this invention using methanol in combination with a gas oil type of hydrocarbon charge stock, a ratio of methanol to hydrocarbon charge passed to the cracking or conversion operation will vary considerably and may be selected from within the range of from about 0.01 to about 5, it being preferred to maintain the ratio within the range of about 0.05 to about 0.30 on a stoichiometric weight basis. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

In a specific embodiment, this invention includes the catalytic cracking of high boiling residual hydrocarbons in the presence of hydrogen and carbon-hydrogen contributing materials in the presence of crystalline zeolite conversion catalysts particularly performing the chemical reactions of cracking, hydrogen redistribution, olefin cyclization and chemical reaction providing mobile hydrogen in one of several different forms and suitable for completing desired hydrogen transfer reactions. The chemical reactions desired are particularly promoted by a mixture of large and small pore crystalline zeolites in the presence of hydrogen donor materials such as methanol or a mixture of reactants which will form methanol under, for example, Fischer-Tropsch, or other processing conditions. The conditions of cracking may be narrowly confined within the range of 900°F. to 1100°F. at a hydrocarbon residence time within the range of 0.5 second to about 5 minutes. The catalyst employed is selected from a rare earth exchanged X or Y faujasite type crystalline zeolite material, a mordenite or ZSM–5 type crystalline zeolite either component of which is employed alone in an amount within the range of 2 weight percent up to about 15 weight percent dispersed in a suitable matrix material. The faujasite and mordenite crystalline zeolites may be employed alone, together, or in admixture in any combination thereof with a ZSM–5 type of crystalline zeolite supported by the same matrix or by a separate silica-clay matrix containing material.

DISCUSSION OF SPECIFIC EMBODIMENTS

EXAMPLE 1

A heavy vacuum gas oil (HVGO) was used as the hydrocarbon feed in the cracking operations of the following examples and provided the following inspections: API gravity (60°F) 20.3; refractive index, 1.5050; average molecular weight 404; weight percent hydrogen, 11.81; weight percent sulfur, 2.69; weight percent total nitrogen, 0.096; basic nitrogen (p.p.m.), 284; metals; less than 2 p.p.m.; boiling range, 748°F.(10%) – 950°F.(90%). The methanol used with the hydrocarbon feed in comparative runs was C.P. grade methanol.

In run B of Table I presented below, a mixture of methanol (16.5 weight percent based on HVGO) and (HVG0) heavy vacuum gas oil identified above were pumped from separate reservoirs to the inlet of a feed preheater of a 30 ft. bench scale riser FCC unit. The feed materials were intimately mixed in the feed preheater at 790°F. and then admitted to the riser inlet, where the hot (1236°F) equilibrium catalyst (15 wt.% REY) (67.5 FAI) (fluid activity index) was admitted and catalytic reaction allowed to occur. The catalyst Fluid Activity Index (FAI) is defined as the conversion obtained to provide a 356°F. 90% ASTM gasoline product processing a Light East Texas Gas Oil (LETGO) at a 2 c/o, 850°F. 6 WHSV for 5 minutes on-stream time. Conversion is defined as 100-cycle oil product. The riser reactor inlet and mix temperature were 1000°F., ratio of catalyst to oil (Oil = HVGO + $CH_3OH$) by weight was 4.07, catalyst residence time was 4.8 sec., riser inlet pressure was 30 psig, and ratio of catalyst residence time to oil residence time (slip) was 1.26. The riser effluent was passed through a steam stripping chamber, and the gaseous effluent was separated from spent catalyst (1.02 weight percent carbon). The gaseous and liquid products were collected and separated by distillation and analyzed. Data for the operating conditions and mass balance are shown in Table I below.

TABLE I-A

HEAVY VACUUM GAS OIL WITH/WITHOUT METHANOL
REACTION CONDITIONS AND MASS BALANCE
15% REY CATALYST

| | Run A | Run B |
|---|---|---|
| CONDITIONS | | |
| Reactor Inlet Temp., °F. | 1000 | 1000 |
| Oil Temp., °F. | 790 | 790 |
| Catalyst Inlet Temp., °F. | 1236 | 1237 |
| Catalyst/oil (Wt/Wt) Ratio[b] | 3.96 | 4.07 |
| Catalyst Residence Time, Sec. | 4.87 | 4.80 |
| Reactor Pressure, Inlet, psig | 30 | 30 |
| Carbon, Spent Catalyst, % Wt. | .963 | 1.022 |
| Sulfur, Spent Catalyst, % Wt. | .0173 | .0204 |
| Slip Ratio | 1.27 | 1.26 |
| Catalyst | ←15% REY→ FAI 67.5, burned white | |
| (NLB ON TOTAL FEED) | | |
| Conversion, % Vol.[a] | 65.23 | 63.20 |
| $C_5$+ Gasoline, % Vol. | 53.53 | 50.06 |
| Total $C_4$, % Vol. | 13.03 | 9.90 |
| Dry Gas, % Wt. | 7.36 | 9.92 |
| Coke, % Wt. | 4.11 | 4.82 |
| Gaso. Efficiency, % Vol. | 82.06 | 79.2 |
| Gasoline R+O, Raw Octane | 87.8 | 89.5 |
| $H_2$ Factor | 27 | 15 |
| Recovery, % Wt. | 96.83 | 102.49[c] |
| Wt.% $CH_3OH$, % of Heavy Vaccum Gas Oil | — | 16.5 |
| Molar ratio, $CH_3OH$/HVGO | — | ~2.1 |

[a]356°F. at 90% cut point
[b]On $CH_3OH$ + HVGO
[c]Includes added mass from $CH_3OH$ reaction.

| Detailed Mass Balance[a] | Run A | Run B |
|---|---|---|
| $H_2S$, % Wt. | .58 | .10 |
| $H_2$, % Wt. | .05 | .08 |
| $C_1$, % Wt. | .89 | 3.83 |
| $C_2$=, % Wt. | .56 | .84 |
| $C_2$, % Wt. | .75 | .92 |
| $C_3$=, % Vol. | 6.26 | 5.75 |
| $C_3$, % Vol. | 1.86 | 1.67 |
| $C_4$=, % Vol. | 7.28 | 6.67 |
| i-$C_4$, % Vol. | 4.65 | 2.53 |
| n-$C_4$, % Vol. | 1.10 | 0.71 |

TABLE I-A-continued

| | | |
|---|---|---|
| $C_5$=, % Vol. | 5.54 | 5.33 |
| i-$C_5$, % Vol. | 4.36 | 2.29 |
| n-$C_5$, % Vol. | 0.89 | 0.58 |
| $C_5$+ Gaso., % Vol. | 53.53 | 50.06 |
| Cycle Oil, % Vol. | 34.77 | 36.85 |
| Coke, % Wt. | 4.11 | 4.82 |

Note:
[a]Selectivities are based on total products arising from methanol + HVGO reaction.

TABLE I-B

GASOLINE INSPECTIONS

| | Run A | Run B |
|---|---|---|
| Sp. Grav., 60°F. | .7495 | .7491 |
| API Grav., 60° | 57.3 | 57.4 |
| Alkylates % Vol. | 22.63 | 18.18 |
| $C_5$+ Gasoline + alkylate, % Vol. | 76.16 | 59.29 |
| Outside i-$C_4$ required, % Vol. | 10.65 | 10.04 |
| R+O Octane No., Raw | 87.8 | 89.5 |
| Hydrocarbon Types $C_5$- Free, vol. % | | |
| Paraffins | 33.1 | 18.9 |
| Olefins | 24.1 | 43.6 |
| Naphthenes | 12.1 | 7.2 |
| Aromatics | 30.2 | 30.2 |
| Distillation, °F. | | |
| 10% | 79 | 94 |
| 50% | 222 | 233 |
| 90% | 349 | 363 |

TABLE I-C

CYCLE OIL INSPECTIONS

| | Run A | Run B |
|---|---|---|
| Sp. Grav., 60°F. | .9984 | .9746 |
| API Grav., 60°F. | 10.23 | 13.69 |
| Sulfur, % Wt. | 4.45 | 4.24 |
| Hydrogen, % Wt. | 8.21 | 9.18 |
| Hydrocarbon Type, Wt. % | | |
| Paraffins | 7.3 | 8.8 |
| Mono-naphthenes | 2.3 | 2.5 |
| Poly-naphthenes | 4.4 | 5.9 |
| Aromatics | 86.1 | 82.8 |
| Naphthene/Aromatic/wt/wt/ratio | .078 | 0.10 |
| Distillation, °F. | | |
| 10% | 470 | 429 |
| 50% | 695 | 540 |
| 90% | 901 | 794 |
| Aromatic Breakdown, Normalized, Wt.-% | | |
| Mono-aromatics | 17.9 | 26.3 |
| Di-aromatics | 37.2 | 37.8 |
| Tri-aromatics | 10.1 | 9.1 |
| Tetra-aromatics | 8.3 | 5.5 |
| Pento-aromatics | 1.3 | 1.1 |
| Sulfur Compounds | | |
| Benzothiophene | 10.2 | 8.3 |
| Dibenzothiophene | 10.4 | 6.2 |
| Naphthobenzothiophene | 4.6 | 3.3 |
| Other | 0.2 | 2.4 |
| Ratio, Diaromatics/Benzothiophene | 3.65 | 4.55 |

A control run A presented in Table I was made with the identified HVGO alone (no methanol present) in the same manner identified above with Run B. An analysis of the comparative data obtained with the REY catalyst show the following improvements associated with the use of methanol as a "low molecular weight hydrogen donor" when intimately mixed with and cracked with HVGO in a riser fluid catalyst cracking operation.

1. Much higher levels of aromatics + olefins in the gasoline (aromatics and olefins are the major contributors to octane number in gasoline).

2. Higher octane (89.5 R+O with $CH_3OH$ vs 87.8 r+O without $CH_3OH$).

3. Lower percent sulfur in fuel oil (4.24 wt.% with $CH_3OH$ vs 4.45 wt.% without $CH_3OH$).

4. Higher percent hydrogen in fuel oil (9.18 wt.% with $CH_3OH$ vs 8.21 wt.% without $CH_3OH$).

5. Higher naphthene/aromatic ratios in fuel oil 0.10 with methanol vs 0.08 without methanol).

6. Higher ratios of Diaromatics/Benzothiophenes (4.55 with $CH_3OH$, 3.65 without $CH_3OH$); this indicates that increased desulfurization occurs with methanol.

EXAMPLE 2

In this example, the heavy vacuum gas oil identified in Example 1 was cracked with and without the presence of methanol with a catalyst mixture comprising a 2% REY crystalline zeolite in combination with a 10% ZSM-5 crystalline zeolite and supporting matrix (silica-clay). The method of operation was carried out similarly to that identified with respect to Example 1. Table II-A below provides the reaction conditions and mass balance obtained for Runs C (no methanol) and Run D (with methanol). Table II-B provides the gasoline inspection data for runs C and D and Table II-C provides the cycle oil inspection data for these two runs.

TABLE II-A

REACTION CONDITIONS AND MASS BALANCE

|  | Run C | Run D |
|---|---|---|
| OPERATING CONDITIONS | | |
| Reactor Inlet Temp., °F. | 900 | 900 |
| Oil Temp., °F. | 500 | 500 |
| Catalyst Inlet Temp., °F. | 1110 | 1102 |
| Catalyst/Oil (Wt/Wt) Ratio | 6.68 | 6.81[a] |
| Catalyst Residence Time, Sec. | 4.70 | 6.11 |
| Reactor Pressure, Inlet, psig | 30 | 30 |
| Carbon, Spent Catalyst, %Wt | .285 | .342 |
| Sulfur, Spent Catalyst, %Wt | .0091 | .0006 |
| Slip Ratio | 1.24 | 1.24 |
| Catalyst | ←2% REY +10% ZSM-5→ | |
| YIELDS (NLB ON TOTAL FEED) | | |
| Conversion, % Vol[a] | 44.16 | 42.66[b] |
| $C_5+$ Gasoline, % Vol. | 33.12 | 35.15 |
| Total $C_4$, % Vol | 12.04 | 6.59 |
| Dry Gas, % Wt | 5.47 | 5.29 |
| Coke, % Wt | 2.08 | 2.83 |
| Gaso. Efficiency, % Vol | 75.0 | 82.39 |
| Gasoline R+O, Raw Octane No. | — | — |
| $H_2$ Factor | 99 | 25 |
| Recovery, % Wt. | 94.9 | 95.10 |

[a]356°F at 90% cut point
[a]on $CH_3OH$ + HVGO
[b]based on HVGO only

| Wt. % $CH_3OH$, % of Heavy-72-D-611 Vacuum Gas Oil | — | 16.0 |
|---|---|---|
| Molar Ratio, $CH_3OH$/HVGO | — | ~2.1 |

|  | Run C | Run D |
|---|---|---|
| Detailed Mass Balance | | |
| $H_2S$, % Wt. | .19 | .09 |
| $H_2$, % Wt. | .06 | .06 |
| $C_1$, % Wt. | .19 | 1.68 |
| $C_2^=$, % Wt. | .20 | .33 |
| $C_2$, % Wt. | .22 | .36 |
| $C_3^=$, % Vol. | 7.47 | 4.60 |
| $C_3$, % Vol. | .80 | .34 |
| $C_4^=$, % Vol. | 8.13 | 5.00 |
| $i-C_4$, % Vol. | 3.34 | 1.13 |
| $n-C_4$, % Vol. | .57 | .46 |
| $C_5^=$, % Vol. | 5.82 | 3.98 |
| $i-C_5$, % Vol. | 2.45 | 1.05 |
| $n-C_5$, % Vol. | .51 | .23 |
| $C_5+$ Gaso., % Vol. | 33.12 | 35.15 |
| Cycle Oil, % Vol. | 55.84 | 57.34 |
| Coke, % Wt. | 2.08 | 2.83 |
| Gaso./coke(wt/wt) Ratio | 12.82 | 10.14 |
| Gaso./gas | 4.87 | 5.43 |

TABLE II-B

GASOLINE INSPECTIONS

|  | Run C | Run D |
|---|---|---|
| Sp. Grav., 60°F. | .7487 | .7620 |
| API Grav., 60°F. | 57.5 | 54.2 |
| Alkylate, % Vol. | 26.05 | 16.03 |
| $C_5+$ Gaso. + Alky., % Vol. | 59.17 | 51.19 |
| Outside $i-C_4$ Required, % Vol. | 14.26 | 9.69 |
| R+O Octane No., Raw | — | — |
| Hydrocarbon Type, $C_5$-Free, Vol. % | | |
| Paraffins | 23.6 | 10.4 |
| Olefins | 32.4 | 57.3 |
| Naphthenes | 18.1 | 5.9 |
| Aromatics | 25.7 | 26.4 |
| Distillation, °F. | | |
| 10% | — | — |
| 50% | — | — |
| 90% | — | — |

TABLE II-C

CYCLE OIL INSPECTIONS

|  | Run C | Run D |
|---|---|---|
| Sp. Grav., 60°F. | .9701 | .9580 |
| API Gravity, 60°F. | 14.4 | 16.2 |
| Sulfur, % Wt. | 4.04 | 3.39 |
| Hydrogen, % wt. | 10.13 | 10.64 |
| Hydrocabon Type, Wt. % | | |
| Paraffins | 15.7 | 16 |
| Mono-naphthenes | 6.9 | 7.8 |
| Poly-naphthenes | 9.2 | 10.1 |
| Aromatics | 68.3 | 66.2 |
| Naphthene/Aromatic (Wt/Wt) Ratio | .23 | .27 |
| Distillation, °F. | | |
| 10% | 536 | 518 |
| 50% | 791 | 756 |
| 90% | 921 | 900 |
| Aromatic Breakdown, Normalized, Wt. % | | |
| Mono-aromatics | 23.4 | 34.2 |
| Di-aromatics | 29.0 | 32.1 |
| Tri-aromatics | 11.0 | 10.0 |
| Tetra-aromatics | 8.9 | 5.5 |
| Penta-aromatics | 1.9 | .9 |
| Sulfur Compounds | | |
| Benzothiophenes | 8.7 | 6.7 |
| Dibenzothiophenes | 8.3 | 5.6 |
| Naphthobenzothiophenes | 5.3 | 2.0 |
| Other | 3.8 | 2.9 |
| Ratio, Diaromatics/Benzothiophene | 3.33 | 4.79 |

It will be observed from Table II-A above that the conversion of the heavy gas oil feed with methanol produced significantly higher yields of $C_5+$ gasoline at a slightly lower conversion level than occurred in the control Run A for comparative purposes. Furthermore, the yield of $C_4$'s was lower, and the gasoline efficiency was much higher with methanol in the feed. An examination of the mass balance yields shows the methanol operation to be associated with higher gasoline and fuel oil yields at the expense of $C_4$ and lower boiling hydrocarbons. Also from the gasoline product inspection Table II-B, it is evident that the gasoline product of the methanol operation will be of a higher octane rating than the gasoline product of Run C, because of increased yields of olefins and aromatics. On the other hand, the cycle oil inspection data of Table II-C, shows lower sulfur compounds in the product of Run C (with methanol); a higher hydrogen content, a higher naphthene to aromatic ratio; less polycyclics and higher aromatics and a higher ratio of diaromatics/ benzothiophene indicating that hydrogen transfer has occurred thus producing a better fuel.

EXAMPLE 3

In this example, the heavy vacuum gas oil identified in Example 1 was converted in the presence of methylal which is a methyl ether of formaldehyde: $(CH_3O)_2CH_2$. The catalyst employed was a mixture comprising 2% REY crystalline zeolite in combination with 10% ZSM-5 type of crystalline zeolite supported by a silica-clay matrix. The method of operation was performed in the same manner identified in Example 1 at the operating conditions provided in Table III below. In the table comparative runs are shown with no promoter Run C and methanol promoter Run D.

TABLE III-A

COMPARISON OF REACTING HVGO WITH METHYLAL AND WITH/WITHOUT METHANOL
REACTION CONDITIONS AND MASS BALANCE

|  | Run C[a] | Run E[b] | Run D[c] |
|---|---|---|---|
| OPERATING CONDITIONS | | | |
| Reactor Inlet Temp., °F. | 900 | 900 | 900 |
| Oil Temp., °F. | 500 | 500 | 500 |
| Catalyst Inlet Temp., °F. | 1110 | 1102 | 1102 |
| Catalyst/Oil (Wt/Wt) Ratio | 6.68 | 6.72[b] | 6.81[e] |
| Catalyst Residence Time, Sec. | 4.70 | 6.02 | 6.11 |
| Reactor Pressure, Inlet, psig | 30 | 30 | 30 |
| Carbon, Spent Catalyst, %Wt. | .285 | .601 | .342 |
| Sulfur, Spent Catalyst, %Wt. | .0091 | .0145 | .0006 |
| Slip Ratio | 1.24 | 1.28 | 1.24 |
| Catalyst | | 2% REY + 10% ZSM-5 | |
| YIELDS (NLB ON TOTAL FEED)[f] | | | |
| Conversion, % Vol[a] | 44.16 | 42.14 | 42.66 |
| $C_5$+ Gasoline, % Vol. | 33.12 | 31.51 | 35.15 |
| Total $C_4$, % Vol. | 12.04 | 6.46 | 6.59 |
| Dry Gas, % Wt. | 5.47 | 5.78 | 5.29 |
| Coke, % Wt. | 2.08 | 4.90 | 2.83 |
| Gaso, Efficiency, % Vol. | 75.0 | 74.8 | 82.39 |
| Gasoline R+O, Raw Octane No. | — | — | — |
| $H_2$ Factor | 99 | 18 | 25 |
| Recovery, % Wt. | 94.9 | 98.1 | 95.10 |
| Wt.% Promoter % of HVGO | 0 | 16.0 | 16.0 |
| Molar Ratio, Promoter/HVGO | 0 | 0.85 | 2.1 |

[a]356°F. at 90% cut point
[b]Methylal = methyl ether of formaldehyde
[c]Methanol
[d]Control Run - no promoter
[e]On promoter + HVGO (heavy vacuum gas oil)
[f]On HVGO feed only

| Detailed Mass Balance | Run C | Run E | Run D |
|---|---|---|---|
| $H_2S$, % Wt. | .19 | 0.1 | .09 |
| $H_2$, % Wt. | .06 | .05 | .06 |
| $C_1$, % Wt. | .19 | 1.89 | 1.68 |
| $C_2^=$, % Wt. | .20 | .35 | .33 |
| $C_2$, % Wt. | .22 | .42 | .36 |
| $C_3^=$, % Vol. | 7.47 | 4.04 | 4.60 |
| $C_3$, % Vol. | .80 | 1.28 | .34 |
| $C_4^=$, % Vol. | 8.13 | 4.83 | 5.00 |
| i-$C_4$, % Vol. | 3.34 | 1.27 | 1.13 |
| n-$C_4$, % Vol. | .57 | .36 | .46 |
| $C_5^=$, % Vol. | 5.82 | 3.88 | 3.98 |
| i-$C_5$, % Vol. | 2.54 | 1.34 | 1.05 |
| n-$C_5$, % Vol. | .51 | .22 | .23 |
| $C_5$+ Gaso., % Vol. | 33.12 | 31.51 | 35.15 |
| Cycle Oil, % Vol. | 55.84 | 57.86 | 57.34 |
| Coke, % Wt. | 2.08 | 4.90 | 2.83 |

TABLE III-B

GASOLINE INSPECTIONS

|  | Run C | Run E | Run D |
|---|---|---|---|
| Sp. Grav., 60°F. | .7487 | .7580 | .7620 |
| API Grav., 60°F. | 57.5 | 55.18 | 54.2 |
| Alkylate, % Vol. | 26.05 | 14.84 | 16.03 |
| $C_5$ + Gaso. + Alky., % Vol | 59.17 | 46.35 | 51.19 |
| Outside i-$C_4$ Required, % Vol. | 14.26 | 8.72 | 9.69 |
| R+O Octane No., Raw | — | — | — |
| Hydrocarbon Type, $C_5$-Free Vol. % | | | |
| Paraffins | 23.6 | 11.8 | 10.4 |
| Olefins | 32.4 | 49.9 | 57.3 |
| Naphthenes | 18.1 | 6.3 | 5.9 |
| Aromatics | 25.7 | 32.0 | 26.4 |
| Distillation, °F. | | | |
| 10% | — | — | — |
| 50% | — | — | — |
| 90% | — | — | — |

TABLE III-C

CYCLE OIL INSPECTIONS

|  | Run C | Run E | Run D |
|---|---|---|---|
| Sp. Grav., 60°F. | .9701 | .9594 | .9580 |
| API Gravity, 60°F. | 14.4 | 16.0 | 16.2 |
| Sulfur, % Wt. | 4.04 | 3.306 | 3.39 |

TABLE III-C-continued

| CYCLE OIL INSPECTIONS | Run C | Run E | Run D |
|---|---|---|---|
| Hydrogen, % Wt. | 10.13 | 10.57 | 10.64 |
| Hydrocarbon Type, Wt. % | | | |
| Paraffins | 15.7 | 15.5 | 16 |
| Mono-naphthenes | 6.9 | 7.6 | 7.8 |
| Poly-naphthenes | 9.2 | 9.7 | 10.1 |
| Aromatics | 68.3 | 67.3 | 66.2 |
| Naphthene/Aromatic (Wt/Wt) Ratio | .23 | 0.26 | .27 |
| Distillation, °F. | | | |
| 10% | 536 | 523 | 518 |
| 50% | 791 | 749 | 756 |
| 90% | 921 | 903 | 900 |
| Aromatic Breakdown, Normalized, Wt.% | | | |
| Mono-aromatics | 23.4 | 29.2 | 34.2 |
| Di-aromatics | 29.0 | 32.2 | 32.1 |
| Tri-aromatics | 11.0 | 11.1 | 10.0 |
| Tetra-aromatics | 8.9 | 6.0 | 5.5 |
| Penta-aromatics | 1.9 | 1.2 | 0.9 |
| Sulfur Compounds | | | |
| Benzothiophenes | 8.7 | 6.9 | 6.7 |
| Dibenzothiophenes | 8.3 | 5.6 | 5.6 |
| Naphthobenzothiophenes | 5.3 | 3.1 | 2.0 |
| Other | 3.8 | 4.6 | 2.9 |
| Ratio, Diaromatics/Benzothiophene | 3.33 | 4.67 | 4.79 |

It will be observed upon examination of the data of Table III that a significant improvement in gasoline quality and cycle oil quality is obtained with either methylal or methanol as a promoter. The gasoline product is shown to have much lower paraffins, much higher olefins and much higher aromatics than obtained by Run C with no promoter. Therefore the gasoline product obtained with the promoter is of a higher octane.

The cycle oil product inspection shows lower sulfur and higher hydrogen in the product of Runs E and D using methylal and methanol as a promoter. In addition there is a higher naphthene/aromatic ratio, lower amounts of the higher molecular weight polyaromatics, more monoaromatics, higher ratio of diaromatics to benzothiophenes — all of which indicate a better quality of fuel oil.

EXAMPLE 4

The cracking of a full range crude oil in the presence of methanol in a bench riser FCC pilot plant at 1000°F. using equilibrium fluid 15% REY type and a mordenite-type crystalline zeolite catalyst is provided below.

The whole crude oil used showed these inspections: API gravity (60°F), 33.2; molecular wt., 358; wt.% hydrogen, 12.83; wt.% sulfur, 1.92; wt.% total nitrogen, 0.084; metals: (Ni + V) 17 ppm; boiling range, 222°F. (10%)–998°F. (88%). The stock was of light Arabian origin. Methanol was C.P. grade, Baker.

Methanol (9.67 wt.% based on crude) and crude were pumped from separate reservoirs to the inlet of the feed preheater of a 30 ft. bench scale riser FCC unit. Stocks were intimately mixed in the feed preheater at 515°F. and then admitted to the riser inlet, where hot (1240°F.) 15% REY catalyst (67.5 FAI) was admitted and catalytic reaction allowed to occur. Riser reactor inlet and mix temperature were 1000°F., ratio of catalyst to oil (Oil = crude + CH$_3$OH) was 8.35, catalyst residence time was 4.6 sec., riser inlet pressure was 30 psig, and ratio of catalyst residence time to oil residence time (slip) was 1.23. Riser effluent then passed through a stream stripping chamber, and gaseous effluent was separated from spent catalyst (0.842 wt. % carbon) and the gaseous and liquid products collected, separated by distillation and analyzed. This run is numbered H-606. Data for the operating conditions and mass balance, gasoline inspections, and cycle oil inspections are shown in Tables 4, 5, 6 and 7, respectively. The crude inspections are detailed in Table 8.

A similar (control) run was made with crude only, with no methanol present (H-605). Our analyses show the following improvements associated with the use of methanol when intimately mixed with and co-reacted with crude in riser FCC unit:

Much better gasoline quality: Mass spectroscopic "PONA" analysis shows less paraffins and more olefins, naphthenes and aromatics; this more hydrogen-deficient gasoline is thus expected to have significantly higher octane number.

| HC Type | Δ, Vol. % |
|---|---|
| P | − 7.6 |
| O | + 1.6 |
| N | + 1.2 |
| A | + 4.7 |
| % Wt. Hydrogen | − .28 |

3. Very slightly more C$_4$'s, especially more butenes (Δ = + 1.42 wt. %).

4. More propylene (Δ = + 0.81 Wt. %) and ethylene (Δ = + 0.44 Wt. %); which can be used as alkylation feed.

5. More pentenes (Δ = + 1.28 Wt. %), which contribute to octane quality in gasoline.

6. Cycle Oil shows higher hydrogen content: (Δ = + 0.52 Wt. % H); this means better burning quality in fuel oil applications or better crackability if recycle of cycle stock is desired.

7. Less nitrogen in coke: This allows lower pollutant nitrogen oxide content in regenerator flue gas.

Table 4

| Reaction of Light Arabian Full Crude With Methanol Over Zeolite Catalyst | | | | |
|---|---|---|---|---|
| Reaction Conditions | H-605 | H-606 | H-650 | H-651 |
| Reactor Inlet Temp., °F. | 1000 | 1000 | 1000 | 1000 |
| Oil Feed Temp., °F. | 505 | 515 | 510 | 510 |
| Catalyst Inlet Temp., °F. | 1240 | 1240 | 1238 | 1218 |
| Catalyst/Oil (wt/wt) Ratio | 6.98 | 8.35[a] | 5.90 | 6.04[a] |
| Catalyst Residence Time, Sec. | 4.29 | 4.59 | 4.53 | 4.43 |
| Reactor Inlet Pressure, Psig | 30 | 30 | 30 | 30 |
| Moles of Product/Mole Feed (ex-coke) | 3.761 | 1.979 | 3.354 | 1.285 |
| Oil Partial Pressure, Inlet, psia | 26.2 | 31.8 | 23.8 | 32.3 |
| Carbon, Spent Catalyst, % wt. | .831 | .842 | .448 | .580 |
| Sulfur, Spent Catalyst, % wt. | .0248 | .0253 | — | — |
| Slip Ratio | 1.24 | 1.23 | 1.25 | 1.24 |
| Nitrogen, Spent Catalyst, % wt. | .0085 | .0066 | — | — |

Table 4-continued

Reaction of Light Arabian Full Crude With Methanol Over Zeolite Catalyst

| Reaction Conditions | H-605 | H-606 | H-650 | H-651 |
|---|---|---|---|---|
| Methanol, wt. % of Crude | — | 9.67 | — | 16.3 |
| Molar Ratio, Methanol/Crude | — | 1.08 | — | 1.82 |
| Catalyst | ←Ashl. Eq. D-10[a]→ 15% REY (burned white) | | ←2% REY - 10% Mordenite[c]→ | |

[a] Based on methanol + crude
[b] Burned white, FAI = 67.5
[c] Burned white FAI = 38.55; matrix = 60% $SiO_2$, 40% clay —Geo. Kaolin SAF—2% Zr.

Table 5

Product Selectivities (Bases: 100g Crude Oil Feed)

| Run | H-605 | H-606 | H-650 | H-651 |
|---|---|---|---|---|
| Charge In | | | | |
| Crude Oil, g | 100.0 | 100.0 | 100.0 | 100.0 |
| Methanol, g | — | 4.2[a] | — | 7.1 |
| Total, g | 100.0 | 104.2 | 100.0 | 107.1 |
| Products Out, g | | | | |
| $C_5+$ Gasoline[c] | 57.88 | 55.12 | 51.07[d] | 52.22[d] |
| Total $C_4$ | 10.56 | 10.70 | 4.62 | 4.26 |
| Dry Gas | 8.07 | 13.15 | 4.99 | 10.55 |
| Coke | 6.35 | 8.38 | 2.87 | 4.40 |
| Cycle Oil | 17.13 | 16.87 | 36.45[d] | 35.66[d] |
| Light Product Breakdown, g | | | | |
| $H_2S$ | .08 | .22 | .13 | .12 |
| $H_2$ | .06 | .11 | .07 | .12 |
| $C_1$ | .95 | 4.49 | .71 | 3.81 |
| $C_2=$ | .75 | 1.19 | .66 | 1.80 |
| $C_2$ | .66 | .94 | .70 | 1.21 |
| $C_3=$ | 3.93 | 4.74 | 2.07 | 2.29 |
| $C_3$ | 1.64 | 1.48 | .66 | 1.20 |
| $C_4=$ | 4.22 | 5.64 | 3.05 | 2.90 |
| $i-C_4$ | 4.57 | 3.64 | .90 | .67 |
| $n-C_4$ | 1.76 | 1.43 | .60 | .70 |
| $C_5=$ | 2.38 | 3.66 | 2.86 | 2.70 |
| $i-C_5$ | 5.17 | 3.85 | 1.38 | 1.24 |
| $n-C_5$ | 1.87 | 1.49 | 1.11 | 1.07 |
| Recovery Wt.% of feed | 88.74 | 99.61 | 92.38 | 89.45 |
| $H_2$-Factor | 30 | 15 | 39 | 16 |
| Gasoline Efficiency, Apparent[e] | 69.8 | 66.3 | 80.4 | 81.2 |

[a] Trace only of $(CH_3)_2O$ in gaseous products.
[b] Basis is on complete removal of $H_2O$ from $CH_3OH$ during reaction i.e., on "$CH_2$" basis.
[c] ~ 356°F. at 90% (ASTM) cut point
[d] Yields are corrected for gasoline in cycle oil and cycle oil in gasoline (from simple distillation)
[e] Defined here as g.gasoline/100g. oil - g. cycle oil × 100.

Table 6

Gasoline Inspections

| Run | H-605 | H-606 | | H-650 | H-651 | |
|---|---|---|---|---|---|---|
| Sp. Grav., 60°F. | 0.7376 | 0.7552 | | 0.7497 | 0.7496 | |
| API Grav., 60°F. | 60.3 | 55.9 | | 57.2 | 57.3 | |
| Alkylate, % Vol. | | | | | | |
| $C_5+$ Gaso. + Alky., % Vol. | | | | | | |
| Outside $i-C_4$ Required, % Vol. | | | | | | |
| R+O Octane No. Raw | | | | | | |
| Aromatics + Olefins (by acid-treatment) | 40 | 46.2 | | 44.5 | 50.4 | |
| Hydrocarbon Type, $C_5$-Free, Vol.% | | | Δ | | | Δ |
| Paraffins | 49.9 | 42.3 | −7.6 | 41.1 | 40.3 | − .8 |
| Olefins | 8.1 | 9.7 | +1.6 | 24.4 | 25.2 | + .8 |
| Naphthenes | 9.9 | 11.1 | +1.2 | 12.5 | 12.3 | − .2 |
| Aromatics | 32.2 | 36.9 | +4.7 | 22.1 | 22.1 | 0 |
| % H | 13.29 | 13.01 | −0.28 | 13.59 | 13.59 | |
| M.W. | 110.63 | 113.73 | | 117.32 | 117.06 | |
| Distillation, °F. (as cut) | | | | | | |
| 10% | 80 | 102 | | 110 | 110 | |
| 50% | 234 | 256 | | 271 | 257 | |
| 90% | 358 | 381 | | 405 | 390 | |

Table 7

Cycle Oil Inspections

| Run | H-605 | H-606 | H-650 | H-651 |
|---|---|---|---|---|
| Sp. Grav., 60°F. | 1.0027 | 1.0016 | .9152 | .9190 |
| API Gravity, 60°F. | 9.62 | 9.77 | 23.11 | 22.5 |
| Sulfur, % Wt. | 1.951 | — | — | — |
| Hydrogen, % Wt. | 8.09 | 8.61 | 11.05 | 10.83 |
| Refractive Index, $n_D 70°C$ | 1.592 | 1.566 | 1.50532 | 1.50755 |
| Hydrocarbon Type, Wt. % | | | | |
| Paraffins | 6.9 | | 38.8 | 38.3 |
| Mono-naphthenes | 1.0 | | 9.4 | 11.4 |
| Poly-naphthenes | 3.9 | | 9.4 | 10.6 |
| Aromatics | 88.3 | | 42.5 | 39.8 |
| Naphthene/Aromatic (Wt/Wt) Ratio | | | .44 | .55 |
| Distillation, °F. (as cut) | | | | |
| 10% | 460 | | 451 | 429 |
| 50% | 547 | | 580 | 542 |
| 90% | 793 | | 790 | 728 |
| Aromatic Breakdown, Normalized, Wt.% | | | | |
| Mono-aromatics | 9.0 | N | 31.6 | 39.4 |
| Di-aromatics | 51.0 | O | 40.4 | 38.1 |

Table 7-continued

Cycle Oil Inspections

| | | | | |
|---|---|---|---|---|
| Tri-aromatics | 10.6 | T | 6.9 | 6.3 |
| Tetra-aromatics | 5.6 | E | 2.9 | 2.1 |
| Penta-aromatics | 1.0 | N | .5 | .5 |
| Sulfur Compounds | | O | | |
| Benzothiophenes | 12.4 | U | 9.6 | 6.7 |
| Dibenzothiophenes | 8.2 | G | 6.0 | 5.1 |
| Naphthobenzothiophenes | 2.2 | H | 1.7 | 1.1 |
| Other | 0.0 | | .4 | .6 |
| Ratio, Diaromatics/Benzothiophenes | | S | | |
| (Wt/Wt) | 4.11 | A | 4.21 | 5.69 |
| | | M | | |
| | | P | | |
| | | L | | |
| | | E | | |

Table 8

Inspections, Full Range Light Arabian Crude Oil

| Description | Lt. Arabian Full Crude | | | |
|---|---|---|---|---|
| Physical Properties | | Distillation | | (type) D-1160 |
| Gravity °API 60°F. | 33.2 | IBP | °F. | 118 |
| Sp. Gravity, 60°F. | .8591 | 5 Vol.%, | °F. | 175 |
| Aniline Point, °F. | 162.5 | 10 Vol.%, | °F. | 222 |
| Pour Point, °F. | −65 | 20 Vol.%, | °F. | 302 |
| Carbon Residue, Wt.% | | 30 Vol.%, | °F. | 395 |
| CCR | 3.81 | | | |
| Molecular Wt. (V.P.) | 358 | 40 Vol.%, | °F. | 476 |
| | | 50 Vol.%, | °F. | 598 |
| Chemical Analyses | | 60 Vol.%, | °F. | 686 |
| | | 70 Vol.%, | °F. | 794 |
| Hydrogen, % Wt. | 12.83 | 80 Vol.%, | °F. | 899 |
| Sulfur, % Wt. | 1.92 | 90 Vol.%, | °F. | (88) 998 |
| Nitrogen, % Wt. | .0840 | 95 Vol.%, | °F. | |
| | | EP | °F. | |
| Metals, ppm | | | | |
| Nickel | 4.5 | | | |
| Vanadium | 12.5 | | | |

EXAMPLE 5

The runs with mordenite-type catalyst (runs H-651 with $CH_3OH$ and H-650 with crude only) were similar to the runs in Example 3, except for the differences shown in Table 4. Our analyses show the following improvements associated with the use of methanol when intimately mixed with and co-reacted with crude in a riser FCC unit using a 2% REY-10% mordenite catalyst:

1. Slightly better gasoline yield: $\Delta = +1.15$ Wt.%
2. Slightly greater (apparent) gasoline efficiency: 81.2 vs 80.4%.
3. Slightly better gasoline quality: slightly lower paraffins, slightly more olefins.
4. More ethylene: ($\Delta = +1.14$ Wt.%) and propylene ($\Delta = +0.22$ Wt.%); these can be used as feed to alkylation unit.
5. More $H_2$-gas ($\Delta = +0.05$ Wt.%); such process-generated $H_2$-gas can lessen needs for outside $H_2$ purchase or reduce need for $H_2$-plant construction. Excess $H_2$ can be used in pretreaters, hydrotreaters, etc.
6. Some indication of more desulfurization in cycle oil: ratio of diaromatics/benzothiophenes is higher (5.69 vs 4.21), and naphthene/aromatic ratio is higher, suggesting a less refractory stock.

It is clear that co-reacting whole crude with methanol over 15% REY catalysts gives a substantial improvement in gasoline quality. Inspection of Table 9 below, however, shows that, in addition, the mordenite catalyst has significant advantages over the 15% REY catalyst:

Table 9

Comparison of 15% REY and 2% REY–10% Mordenite in Cracking of Whole Crude at 1000°F. and About 4.5 Sec. Catalyst Residence Time

| Catalyst Type | 15% REY | 2% REY –10% Mordenite | | |
|---|---|---|---|---|
| FAI, % Conv. | 68 | 38 | | |
| Severity, C/O | ~7.0–8.4 | ~ 6 | | |
| Wt. % $CH_3OH$ | ~10 | ~16 | | |
| | H-605 No $CH_3OH$ | H-606 $CH_3OH$ | H-650 No $CH_3OH$ | H-651 $CH_3OH$ |
| g gaso/100 g crude | 57.88 | 55.12 | 51.1 | 52.2 |
| Gaso/Coke, wt/wt ratio | 9.1 | 6.6 | 17.8 | 11.9 |
| Gaso/Gas, wt/wt ratio | 7.2 | 4.2 | 10.23 | 4.9 |
| Gasoline Efficiency, Apparent[a] | 69.8 | 66.3 | 80.4 | 81.2 |

(a) g Gaso/100 g oil— g cycle oil × 100

Note the sharply higher gasoline/coke and gasoline/gas (wt/wt) ratios obtained with the 2% REY-10% mordenite catalyst, both with and without co-reactant methanol. Further, note the much higher apparent gasoline efficiencies for the mordenite even though the oil conversion of the mordenite-type catalyst is, of course, much lower (and this is to be expected with a catalyst of 56% the FAI activity and with a Cat/Oil (wt/wt) ratio of about 80% that of the 15% REY case). The mordenite type is superior in terms of selectivity for gasoline at the expense of coke and gas.

The drawing is a diagrammatic sketch in elevation of a processing scheme for converting a full boiling range crude oil in the presence of a zeolite cracking catalyst.

Referring now to the drawing by way of example, a raw whole crude such as a full boiling range crude is introduced by conduit 2 to desalter 4. The desalter crude oil boiling generally in the range of −30°F. to about 1300°F. is then passed by conduit 6 to a riser reactor 8. A freshly regenerated crystalline zeolite containing cracking catalyst is introduced to the lower portion of riser 8 by conduit 10. Light $C_2$-$C_5$ hydrocarbons, methanol or oxygen compounds as hereinbefore identified are introduced to the lower portion of riser 8 by conduit 12. These materials may be first mixed with the desalted crude oil before it is added to the riser at a temperature of about 100°F. In the lower portion of riser 8 a mix temperature of catalyst and hydrocarbon feed of about 1050°F. is provided and the catalyst-oil suspension thus formed passes upwardly through the riser conversion zone 8. A hydrocarbon residence time in the riser within the range of 1 to 12 seconds is generally maintained. The catalyst-oil suspension in riser 8 is discharged into cyclonic separating means 14 wherein a separation is made between vaporous material and solid particle material. On the other hand, the suspension in riser 8 may be discharged into an enlarged separation and settling zone wherein catalyst or solid particles separate from vaporous material as a function of a reduction in velocity and the vaporous material with entrained solid fines then passes into cyclonic separating means retained in the separation zone. Cyclonic separating means or zone 14 may be a plurality of sequentially arranged cyclonic separating zones for separating entrained solids from vaporous material passed sequentially therethrough. Each cyclonic separating zone is provided with a catalyst dipleg for passing separated solids to a bed of collected solids normally collected in the lower portion of the separating and settling zone. Vaporous products of the riser 8 conversion operation separated from catalyst solids is withdrawn by conduit 18 for passage to a product fractionator 20.

In fractionator 20, the products of riser conversion herein discussed are separated and recovered as follows. A heavy fuel oil fraction is withdrawn from the bottom of the tower by conduit 22. A portion of this heavy fuel oil may be withdrawn by conduit 24 or recycled to riser 8 by conduit 26. Another portion of the heavy fuel oil may be passed from conduit 24 by conduit 28 to cooler 30 to reduce its temperature to about 550°F. before return by conduit 32 to tower 20 above the feed inlet through conduit 18. A heavy cycle oil fraction is withdrawn from the tower by conduit 34 communicating with conduit 26 and may be recycled to riser 8. A portion of this heavy cycle oil may be withdrawn by conduit 36. A light fuel oil product is withdrawn from the tower by conduit 38. A heavy naphtha fraction is withdrawn from the tower by conduit 40. A portion of this heavy naphtha may be passed by conduits 42 and 44 to a second riser conversion zone more fully discussed below. An overhead fraction is withdrawn from tower 20 by conduit 46 communicating with cooler 48 wherein the temperature of this overhead fraction is reduced to about 100°F. The cooled overhead fraction is then passed by conduit 50 to an accumulator drum 52 provided to separate gasiform material from liquid product materials comprising gasoline boiling range material. The gasiform material is withdrawn from drum 52 by conduit 54 and passed to a light ends processing arrangement not shown. On the other hand, a portion of this gasiform material comprising olefins may be passed to the riser cracking operations herein discussed or to any other cracking operation as desired. The condensed liquid material separated in drum 52 is withdrawn by conduit 56 and a portion thereof is recycled to the upper portion of tower 20 by conduit 58 as reflux material. The remaining portion of the material withdrawn by conduit 56 is withdrawn by conduit 60. Provision is made for recycling the light gasoline in conduit 60 by conduits 62 and 44 to a second riser conversion zone hereinafter discussed. The light gasoline product in conduit 60 not recycled by conduit is withdrawn and may be passed to light ends processing not shown.

A second riser conversion zone 64 referred to hereinafter as a naphtha riser conversion zone receives hot freshly regenerated catalyst in the lower portion thereof by conduit 66 in addition to light hydrocarbons or methanol introduced by conduit 68. The heavy and/or light naphtha recycled as discussed above is introduced to the lower portion of riser 64 by conduit 44. The light hydrocarbons and methanol introduced by conduit 68 may be first admixed with the charge in conduit 44 before contacting the hot catalyst in the lower portion of riser 64. Naphtha boiling range material from sources other than process produced may be introduced by conduit 70. In riser 64, the naphtha charge is upgraded to a higher octane product at riser conversion conditions within the range of 800° to about 1100°F. at a hydrocarbon residence time within the range of 1 to 12 seconds. Catalyst to reactant ratio are maintained within the range of 4 to 30. In riser 64 a suspension of hydrocarbon reactant and catalyst is caused to pass upwardly through the riser under conditions as above provided before discharge preferably into cyclonic separating means 72 provided at the riser discharge. Separating means 72 may comprise a plurality of sequentially arranged separating means for separating entrained solid catalyst particles from the vaporous products of the riser conversion zone 64. On the other hand, the suspension may be discharged from riser 64 into an enlarged separating and catalyst settling zone as discussed above with respect to riser 8. Products of conversion obtained from riser 64 and separated from entrained catalyst solids are removed by conduit 74 and conveyed by conduit 18 to fractionator 20.

In the arrangement of the FIGURE, risers 8 and 64 discharge into cyclonic separating means 14 and 72 housed in a vessel 76 of larger diameter in the upper portion than in the lower portion. A substantially vertical baffle 78 separates the vessel a sufficient distance throughout its vertical height to maintain the catalyst separated from each riser on separate sides of baffle 78. Separate catalyst stripping zones 80 and 82 are provided in the lower portion of the vessel to which stripping gas such as steam is separately introduced by conduits 84 and 86 respectively. Stripped catalyst is withdrawn from the lower portion of zone 80 by conduit 88 and passed to catalyst regeneration not shown. Stripped catalyst is also withdrawn from the lower portion of stripping zone 82 by conduit 90 which may be all passed to the lower portion of riser 8 or a portion thereof may be withdrawn by conduit 92 and passed to catalyst regeneration not shown. Thus the combination operation of the present invention provides for cascading all or a part of the catalyst employed in the naphtha riser conversion operation to the whole crude oil conversion step.

In the processing combination above specifically identified, it is contemplated providing for multiple injection of the carbon-hydrogen contributing material throughout the length of each reaction zone. In addition, it is contemplated using a different catalyst composition in each reaction zone and thus a separate regeneration system for each conversion operation.

Having thus generally described the invention and discussed specific embodiments in support thereof, it is to be understood that no undue restrictions are to be imposed by reason thereof except as defined by the following claims.

We claim:

1. A method for converting a full boiling range oil charge selected from the group consisting of crude oil and syncrudes derived from coal, shale and tar sands which comprises, mixing the oil charge with at least 5 weight percent on feed of a low molecular weight carbon-hydrogen fragment contributor selected from the group consisting of methanol alone or in admixture with $C_2$-$C_5$ olefins, passing the mixture thus formed in contact with a crystalline zeolite cracking catalyst under conversion conditions comprising a temperature within the range of 800° to 1400°F. and an oil charge residence time within the range of 0.5 to 12 seconds, and recovering the products of said cracking operation separate from the catalyst employed therein.

2. The method of claim 1 wherein from about 100 to 200 volume percent of methanol per 100 volume percent of oil charge is employed.

3. The method of claim 1 wherein the crystalline zeolite comprises a faujasite crystalline zeolite.

4. The method of claim 1 wherein the crystalline zeolite comprises a mordenite crystalline zeolite.

5. The method of claim 1 wherein a large pore crystalline zeolite cracking catalyst is employed in combination with a ZSM-5 crystalline zeolite.

6. The method of claim 1 wherein the oil charge comprises a desalted whole crude admixed with from about 5 to about 200 weight percent of $C_5$ and lighter olefins which is thereafter passed in contact with a mordenite crystalline zeolite cracking catalyst at a temperature within the range of 950° to about 1050°F.

7. The method of claim 1 wherein a heavy naphtha product of the cracking operation is recovered and recracked at an elevated temperature in the presence of the carbon-hydrogen fragment contributor to form a higher octane product.

8. The method of claim 1 wherein a heavy cycle oil and a heavy fuel oil product of the cracking operation is recovered and recracked with the full boiling range oil charge to the cracking operation.

9. The method of claim 1 wherein the full boiling range feed boils in the range of −30°F. to about 1300°F.

10. The method of claim 7 wherein the cracking of the full boiling range oil charge and the recycled heavy naphtha product of cracking takes place in separate riser reactors relying upon the same catalyst source and product separation zones.

11. The method of claim 1 wherein the crystalline zeolite cracking catalyst comprises a mixture of faujasite and mordenite crystalline zeolites.

12. The method of claim 11 wherein the mordenite crystalline zeolite is used in a major proportion to the faujasite zeolite component.

13. The method of claim 4 wherein the mordenite component is a dealuminized mordenite crystalline zeolite.

14. The method of claim 11 wherein the mordenite component is a dealuminized mordenite crystalline zeolite.

* * * * *

UNITED STATES PATENT AND TRADEMARK OFFICE
CERTIFICATE OF CORRECTION

PATENT NO. : 3,974,062
DATED : August 10, 1976
INVENTOR(S) : HARTLEY OWEN, EDWARD J. ROSINSKI and PAUL B. VENUTO It is certified that error appears in the above-identified patent and that said Letters Patent are hereby corrected as shown below:

Column 3, Lines 52 & 53.   After "range of", "8-1-5-A" should be -- 8-15-A --.

Column 8, Line 66.   "r+0" should be -- R+O --.

Signed and Sealed this

Tenth Day of May 1977

[SEAL]

Attest:

RUTH C. MASON
Attesting Officer

C. MARSHALL DANN
Commissioner of Patents and Trademarks